Figure 1:
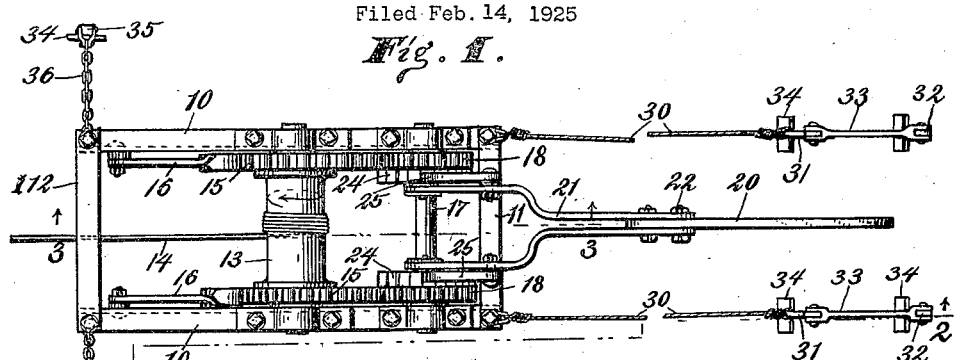

Nov. 8, 1927.

E. R. LONG 1,648,355

PORTABLE HAND PULLER FOR AUTOMOBILES

Filed Feb. 14, 1925

Inventor.
Elmer R. Long.
By
Lockwood & Lockwood
His Attorneys.

Patented Nov. 8, 1927.

1,648,355

UNITED STATES PATENT OFFICE.

ELMER R. LONG, OF PUENTE, CALIFORNIA.

PORTABLE HAND PULLER FOR AUTOMOBILES.

Application filed February 14, 1925. Serial No. 9,184.

This invention relates to improvements in automobile pullers that are of light weight, portable and operable by hand for extracting trucks, automobiles or vehicles that have been mired in places where there are no natural anchorages, such as trees, large rock or the like to which cables for pulling can be attached; and in which places the soil or sand is too loose to hold ordinary stakes or portable anchors. In other words the apparatus is adapted for use in river beds, sand plains and prairies devoid of natural anchorages and having loose sand or soil inadequate to hold ordinary anchors such as are necessary to use in extracting mired vehicles. And an object of this invention is to provide an apparatus that is of light weight and portable as well as efficient in extracting mired vehicles where the surrounding territory constitutes loose sand and soil and is devoid of natural anchorages. That is, the apparatus includes an anchorage effective to hold in loose sand and soil that coacts with the pulling appliance of the apparatus.

One feature of the invention consists in the means for actuating the cable drum, including gears on both ends of the drum, a shaft parallel with the drum, small gears on both ends of the shaft for driving the drum gears, a bifurcated hand lever on the shaft adjacent both small gears, pawls on the lever for engaging and driving the small gears, and pulleys for preventing backlash of the drum, whereby a balanced transmission of power to both ends of the drum will be obtained and also ample multiplication of power. Thus with a small light device weighing only a few pounds and which can be handled by one man, the driver of the truck, and placed in position on the ground and operated by the one man for extricating a mired truck, although heavily loaded with sand, gravel or other material. This makes the device a practical one and it does not require two men to use it, for usually there is only one man on the truck.

Another feature of the invention consists in mounting the pulling mechanism on a frame which is anchored to the ground and which has U-shaped bars at both ends that rest upon the ground and support the frame in an elevated position for ample clearance to the gearing.

Another feature of the invention is in the anchorage. Two anchors are connected with the two corners of the frame at one end to resist longitudinal movement of the frame under the pull of the load. Two other anchors extend from the other end of the frame but laterally to prevent side-wise movement of the frame and particularly twisting movement thereof during the pulling.

Figure 2:
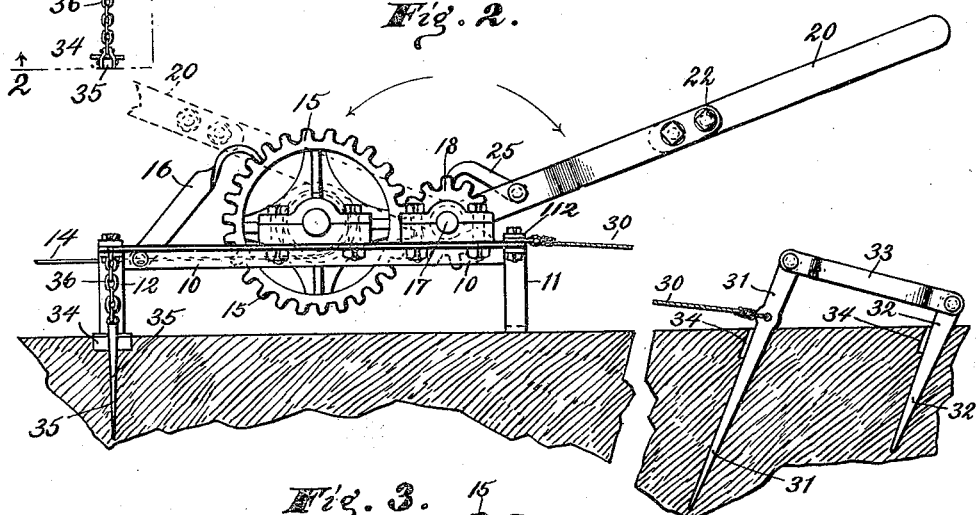
Figure 3:
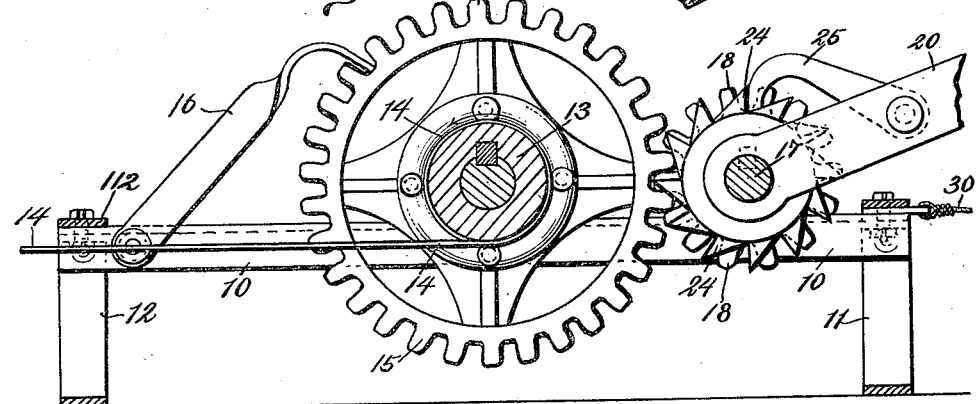
Figure 4:
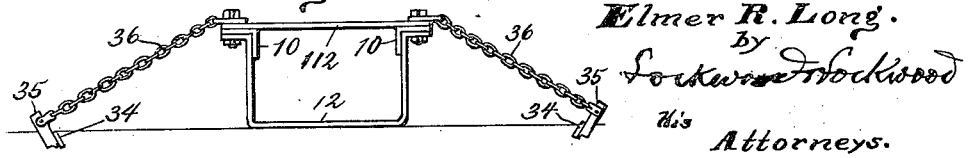

The foregoing and other features of the invention will be more fully understood from the accompanying drawings and the following description and claims:

In the drawings Fig. 1 is a plan view of the device while in use, parts being broken away. Fig. 2 is a side elevation thereof and a section of the earth in which it is anchored and showing in the broken dotted line the limit of movement of the lever when fully actuated. Fig. 3 is a section on the line 3—3 of Fig. 1 on a larger scale and parts broken away. Fig. 4 is a rear elevation of the frame and it is anchored at that end.

The frame of the device is formed of a pair of light angle irons 10 that are spaced apart and arranged parallel, and have their ends secured by bolts to transverse U-shaped bars 11 and 12 and top cross bars 112. The U-shaped bars rest upon the ground, when the device is in use, and support the mechanism in elevated position, as seen in Figs. 2, 3 and 4 for giving clearance to the gearing. The upper ends of the the U-shaped bars 11 and 12 are bent to fit and engage the flanges of the angle irons 10 and are bolted thereto to brace and hold the frame in a rectangular form.

A cable drum 13 is mounted in bearings secured to the top flanges of the angle irons 10 of the frame for the cable 14 that extends back and is attached to the truck or automobile which is to be pulled. On each end of the drum large gears 15 are secured and the backlash is driven by the pawls 16 which are pivoted to the lower flanges of the angle irons 10 and engage the gears 15. A rod or shaft 17 is mounted in bearings secured to the top flanges of the angle irons 10 in front of and parallel with the drum, and small gears 18 are mounted on the two ends of said rod or shaft 17 and mesh with the large gears 15. The hand lever consists of a single portion 20 and a bifurcated or double-arm portion 21. These two parts are secured together by bolts 22 so that the operations of the lever may be folded together by removing one of the bolts. The two arms 21 of the lever are mounted on the rod or shaft 17 besides rachets 24 that are secured to the small gears 18 and drive said rachets and gears by the pawls 25. This construction is given as a preferable one although the pawls 25 might be arranged so as to engage the small gears 18 if desired.

The front end of the anchorage consists of two short cables 30 connected with the two corners at the front end of the frame by bolts that secure the front parts of the frame together; and these cables are connected to two independent metal stakes 31 adapted to be driven into the ground at an angle as shown in Fig. 2. A forward and shorter stake 32 is provided as a combination for each stake 31 and the upper ends of said stakes are connected by bars 33. Both bars are driven in at a slant and they are provided with cross plates 34 secured to their rear faces and which are imbedded in the sand or loose soil when the stakes are driven, so as to increase the resistance to the pull on the stakes. The short stakes 32 being connected with the upper ends of the longer stakes 31 also greatly aid in this particular.

Also stakes 35 are provided with cross plates 34 and their upper ends are connected by chains 36 to the rear corners of the frame by bolts that secure the rear parts of the frame together; and these anchors extend out laterally from the frame and not only aid in holding the frame down but also prevent the twisting of the frame when the device is under strain.

The apparatus including the anchorage is so small and light that it can be easily carried in an automobile or truck or under a man's arm, and one man, the truck driver, can anchor it, hitch it to the automobile and pull the truck or automobile out of the mire by himself. This is the chief virtue of the invention.

The invention is:

The combination of an automobile puller including a rectangular frame having a pair of parallel spaced angle irons on which a cable drum and drum actuating means are mounted; U-shaped bars having upper ends fitted and secured to the flanges of the angle irons so as to brace and hold them parallel and in spaced relation to one another, said bars also adapted to support the drum and drum actuating means clear of the ground when in use; metal stakes; chains secured to said frames and to two of said stakes and adapted to extend laterally from both sides of the rear end of the frame to prevent sidewise and twisting movement thereof when in use; cables secured to the other stakes and to each corner of the front end of the frame for preventing longitudinal movement of the frame when in use; and cross plates secured to said stakes and arranged to extend into loose sand or soil to reinforce said stakes in resisting displacement thereof when the automobile puller is in use.

In witness whereof, I have hereunto affixed my signature.

ELMER R. LONG.